Nov. 28, 1967  K. L. BENSON  3,355,643
PLURAL REMOTE CONTROLLERS FOR PLURAL MOTORS
USING A COMMON POWER CONNECTION
Filed Jan. 28, 1964  3 Sheets-Sheet 2
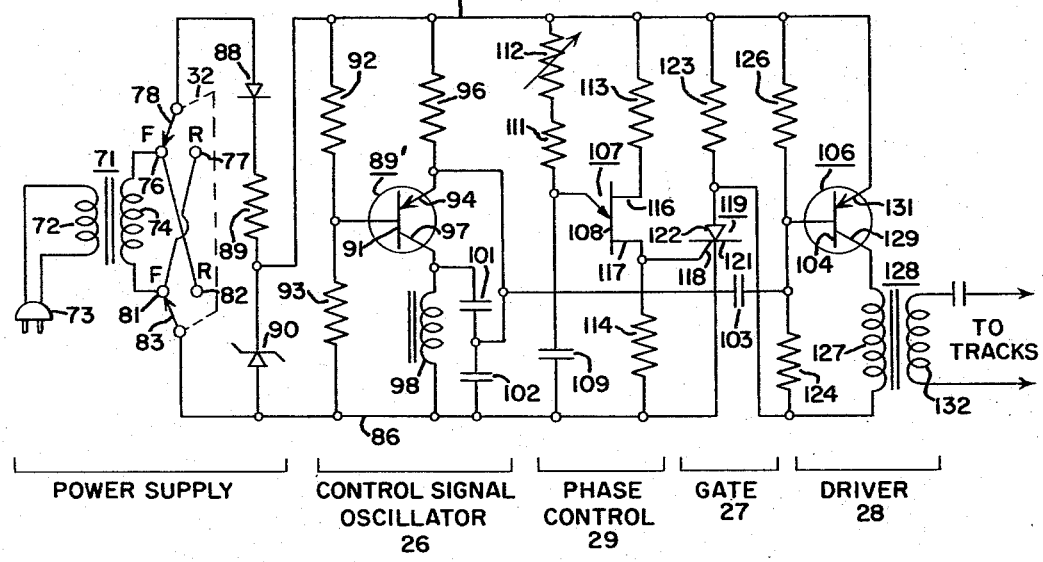
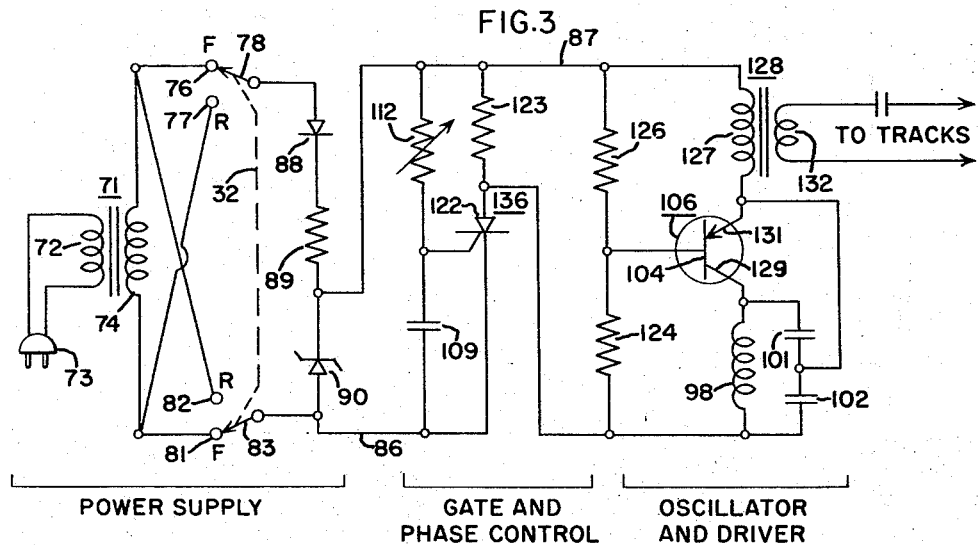
INVENTOR:
KENNETH L. BENSON,
BY Norman C. Fulmer
HIS ATTORNEY.

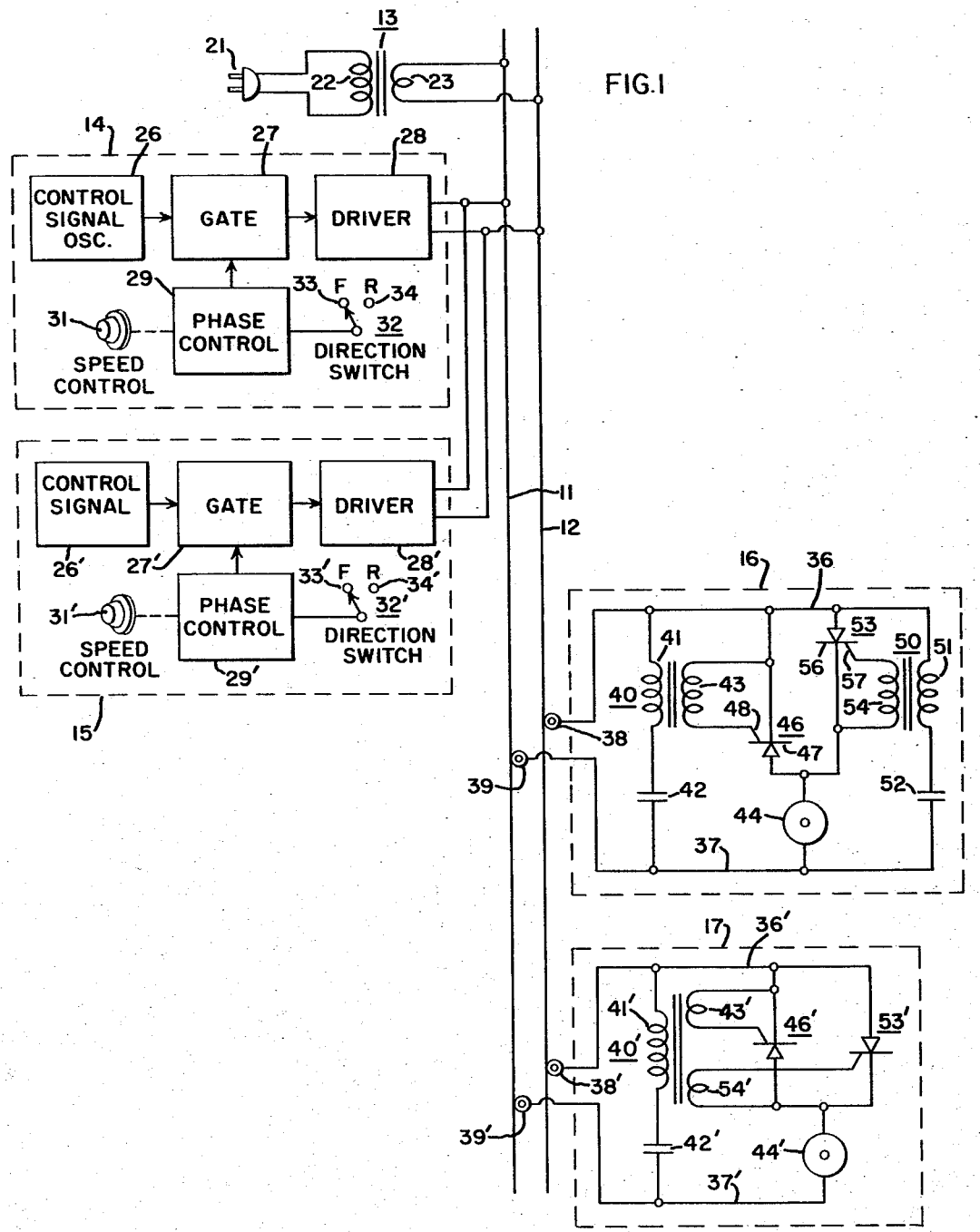

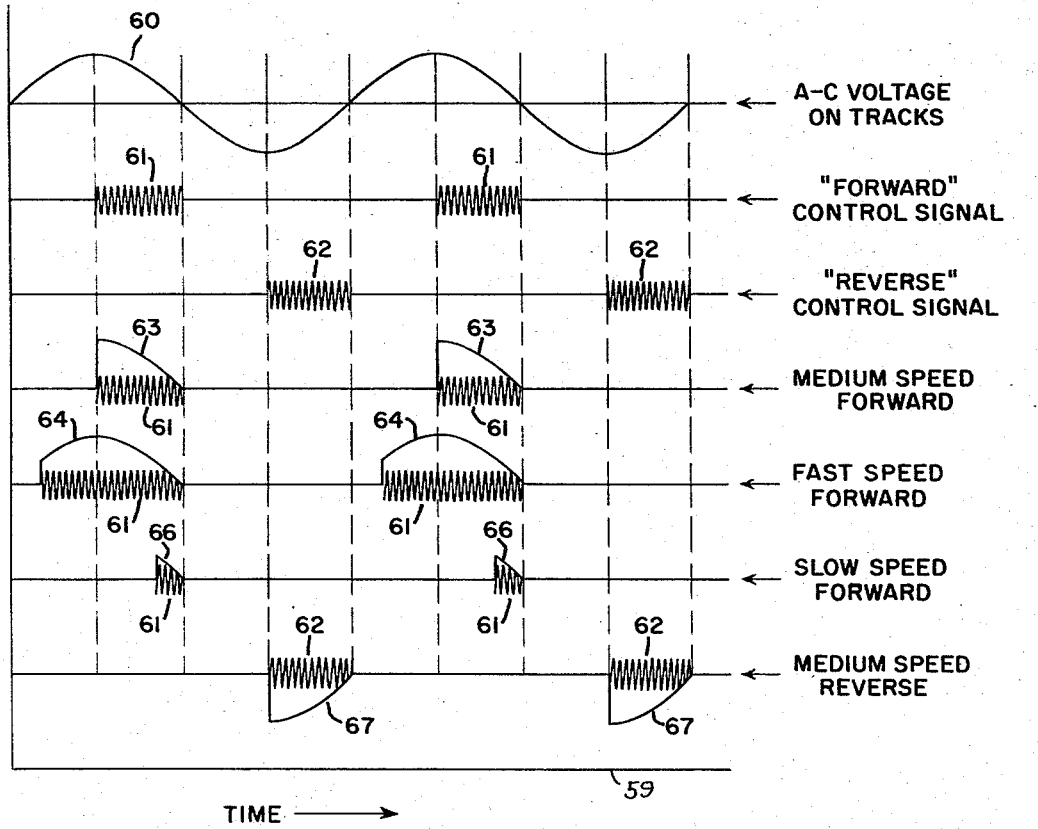

United States Patent Office 3,355,643
Patented Nov. 28, 1967

3,355,643
PLURAL REMOTE CONTROLLERS FOR PLURAL MOTORS USING A COMMON POWER CONNECTION
Kenneth L. Benson, Decatur, Ill., assignor to General Electric Company, a corporation of New York
Filed Jan. 28, 1964, Ser. No. 340,673
2 Claims. (Cl. 318—55)

This invention relates to circuits for controlling electric motors, and is particularly useful for independently controlling the motors in a plurality of model trains, cars, or other vehicles running on a common track or electrical power system, where it is desired to selectively vary the speeds and/or directions of the motors. The invention will be particularly described as applied to a model train system, and is similarly applicable to an automobile system, or the like.

A principal objective of model railroading is realism. Numerous arrangements have been devised in the past for controlling a plurality of trains on the same track, but they leave room for improvement in realism, accuracy of control, versatility, simplicity, low cost, and other features.

An object of the invention is to provide an improved control for electric motors.

Another object is to provide an improved control for a plurality of model vehicles operating on a common electrical track or power system.

A further object is to provide an improved model vehicle control system that is low cost, and which is reliable and versatile in operation.

Still other objects will be apparent from the following descriptions and claims, and from the accompanying drawing.

The motor control of the invention comprises, basically and in its preferred embodiment, an electrical system for applying alternating electrical power current, at 60 cycles for example, to at least one electric motor operable on unidirectional current, such as the DC motor of a model electric train or automobile. A transmitter is provided having means for producing and applying to the electrical system repetitive control pulses of alternating voltage of given frequency during at least a portion of alternate half-cycles of the alternating power current, the frequency of the alternating voltage being greater than that of the alternating power current, and there being means to vary the phase of the control pulses with respect to the alternating current. Additional transmitters may be provided, producing pulses of alternating voltage at different frequencies. A receiver at the motor has electrically controlled rectifier means such as one or more silicon controlled rectifier associated with the motor and adapted to apply the alternating power current to the motor during alternate half cycles of the power current whenever actuated by a control pulse, and a filter associated with the rectifier means and responsive to the given frequency of the control pulses so as to permit only control pulses having an alternating voltage of the given frequency to actuate the rectifier means, whereby variation of the phase of the control pulses will vary the power applied to the motor. The invention also comprises a second electrically controlled rectifier associated with the motor in opposite power phase with respect to the first rectifier and actuable by the given frequencies, and means for shifting the timing of occurrence of the control signals from one plurality of half cycles of the alternating power to the other plurality thereof whereby the direction of operation of the motor is changed. Additional receivers, responsive to different control-pulse frequencies, may be used for selective control of a plurality of motors.

The invention also comprises transmitter and receiver circuitry for the control system.

In the drawing:

FIGURE 1 is a diagram of a motor control system utilizing a preferred embodiment of the invention;

FIGURE 2 is an electrical schematic diagram of a preferred embodiment of a transmitter circuit for producing control pulses;

FIGURE 3 is an electrical schematic diagram of an alternative transmitter circuit; and FIGURE 4 is a chart showing the electrical voltages and their phase relationship to one another, to illustrate the functioning of the invention.

Now referring to FIGURE 1, the two parallel lines 11 and 12 represent electrical tracks of a model train (or automobile or other vehicle) system, numeral 13 indicates alternating power current means for the system, numerals 14 and 15 represent control pulse transmitter means, and numerals 16 and 17 represent motor controlled vehicles such as model trains, automobiles, or the like.

The power supply 13 is shown as comprising a plug 21 for insertion into ordinary household 110 v. 60 cycle power outlets, a transformer having a primary winding 22 connected to the terminals of plug 21, and a secondary winding 23 for producing, for example, about 10 to 20 volts AC at 60 cycles, the ends of this secondary winding being respectively connected to the tracks 11 and 12.

The transmitter 14 is shown as comprising a control signal oscillator 26 the output of which is connected to a gate circuit 27, the output of which is connected to a driver or amplifier circuit 28, the output of which is connected to the tracks 11 and 12. A phase control circuit 29 is connected to the gate circuit 27. A speed control knob 31 is associated with the phase control circuit 29, as also is a direction switch 32 having forward and reverse positions 33 and 34, respectively. The transmitter 15 is the same as transmitter 14, except that its control signal oscillator 26′ oscillates at a different frequency than that of the oscillator 26 in the transmitter 14. Similarly, any desired number of transmitter circuits may be employed, the outputs thereof being connected together and in parallel across the tracks 11 and 12, each of these transmitters having a control signal oscillator of different frequency. These transmitters can be arranged together so that a single person can control the trains, or they can be separated so that several people can each control a train.

The remotely controlled train or other vehicle 16 comprises two conductors or wires 36, 37 connected respectively to wheels or sliding brush connectors 38, 39 which make electrical contact with the tracks 11 and 12, respectively. A first series resonant circuit comprising an inductor 41 connected in series with a capacitor 42, is connected between the conductors 36 and 37, this series circuit being resonant at the same frequency as the alternating signal produced by the control signal oscillator 26, for example 100 kilocycles per second. A secondary winding 43 is inductively coupled to the inductor 41.

The motor 44 of the train, automobile, or other controlled device is connected in series with an electronically controlled rectifier switching device 46, such as a silicon controlled rectifier (commonly referred to as SCR), across the conductors 36 and 37. The secondary winding 43 is connected between the cathode 47 and the control electrode 48 of the SCR 46. A second series resonant circuit 50, comprising an inductor 51 and a capacitor 52 connected in series, is connected across the conductors 36 and 37, and is tuned to the same control signal frequency as is the tuned circuit 40. A second SCR 53 is connected in parallel with the SCR 46, in inverse polarity relationship with unlike current electrodes connected together, and a secondary winding 54, inductively coupled to the inductor 51, is connected between the cathode 56 and a control electrode 57 of the SCR 53.

The receiver circuit shown for the vehicle 17, is an improvement over the circuit of vehicle 16, in that the two secondary windings 43' and 54' are both inductively coupled to the inductor 41' of the resonant filter 40', whereby the series resonant filter circuit 50 shown in the vehicle 16, is dispensed with. Otherwise, the motor control circuits 16 and 17 are alike, except that the resonant filter 40' of circuit 17 is tuned to a different frequency, for example 200 kilocycles, from the frequency to which the filter 40 of circuit 16 is tuned, whereby the circuits 16 and 17 respond to, and are controllable by, different frequency control signals as produced by the different transmitters 14 and 15, as will be described.

Before describing the detailed transmitter circuits shown in FIGURES 2 and 3, the functioning of the invention will be described, with reference to FIGURES 1 and 4. In FIGURE 4, the horizontal axis 59 represents time.

The power supply 13 applies a 60 cycle AC voltage and current to the tracks 11, 12, as indicated by the curve 60 in FIGURE 4, which is applied in a controlled manner to the motors 44, 44', etc. of the various vehicles, and this alternating current 60 also powers headlights of vehicles, and other lights and accessory devices which may be connected to the tracks. The control signal oscillator 26 oscillates at a particular frequency, for example 100 kc., and the gate circuit 27, under control of the phase control circuit 29, applies portions of the oscillation signal, via the driver stage 28, to the tracks 11, 12, during selective intervals of alternate half cycles of the alternating power current 60. FIGURE 4 shows "forward" control signal pulses 61 which occur during each positive polarity half-cycle of the power current 60. When these control pulses 61 occur, they actuate the controlled rectifiers 46 and 53, and some power current flows through one of them and through the motor 44, thereby causing the motor 44 to rotate in the "forward" direction. This control is brought about due to the frequency selective filters 40 and 50 selecting and applying the 100 kc. control pulse bursts, via the secondary windings 43 and 54, to the control electrodes 48 and 57 of the two SCR's 46 and 53. The secondary windings 43 and 54 are connected so that each of the SCR's is enabled to conduct, however, only one SCR, for example the SCR 53, is connected in proper polarity with respect to these particular half cycles of power current, so as to conduct unidirectional current to the motor 44. If the phase of the control pulses is reversed, by means of the direction switch 32, they will occur during the negative polarity alternate half cycles of the power current 60, as indicated by numerals 62 in FIGURE 4. As described before, these 100 kc. pulses will be selected by the tuned filters 40 and 50, and applied to the SCR's 46 and 53, whereupon the SCR 46 (being connected to conduct negative-polarity current) will be rendered conductive so as to apply negative polarity current to the motor 44, whereby the motor 44 will rotate in "reverse" direction.

Adjustment of the speed control knob 31 varies the phasing, during the half-cycles of power current, at which the control pulses occur. Numeral 63 in FIGURE 4 indicates the unidirectional power current applied to the motor 44, via the "forward" SCR 53, when the control signal pulse 61 is phased so as to commence mid-way of the positive polarity alternate half cycles of power current. This applies "medium" forward power to the motor, as determined by the average value of all the current impulses 63 whereby the motor rotates at medium forward speed. By phasing the control signal pulses relatively earlier, by means of the speed control knob 31, more power current, as indicated by numeral 64 in FIGURE 4, will be applied to the motor, whereupon it will rotate forwardly at "fast" speed. Conversely, if the phasing of the control signal pulses is retarded with respect to the power current 60, there will be relatively small amounts of power applied to the motor 44, as indicated by the numeral 66 in FIGURE 4, and the motor will run at "slow" speed. If the control pulses are retarded sufficiently in phase, the motor will stop. When the control signal pulses are phased to occur during negative half-cycles of the power current 60, by means of the direction switch 32, the power current, passed by the SCR 46 to the motor 44, will be in negative polarity direction, as indicated by numeral 67 in FIGURE 4, and will cause motor 44 to rotate in the "reverse" direction. Advancing or retarding the phase of occurrence of the control pulses 62, by means of speed control knob 31, will cause the motor 44 to rotate faster or slower, as described above in connection with the "forward" speed thereof.

The SCR's 46 and 53, which are used to perform the electrically controlled switching, have the characteristic, after being turned on, of remaining turned on and hence conductive until the AC power current 60 falls below a small value known as the "maintenance current," so that the control signal pulses may, if desired, be of short duration, the important thing being the relative phase or timing of their commencement, which determines the timing of turn-on of the SCR's during the half-cycles of power current 60, and the SCR's will turn off near the end of each half-cycle of power current. However, the circuit to be described for the transmitter 14, which is shown in FIGURE 2, produces control pulses which, irrespective of the timing of their commencement, have a duration until the power voltage 60 passes through 0, and therefore, devices could be used, in lieu of the SCR's shown, which remain on only so long as a control signal is applied to their control electrodes.

The second transmitter 15, functions with respect to the second receiver circuit 17, exactly as has been described with reference with transmitter 14 and receiver 16, since the alternating voltage of the control pulses produced by transmitter 15 are passed by the resonant filter circuit 40' which is tuned to that frequency, whereupon the secondary windings 43' and 54' activate the SCR's 46' and 53', whereupon, depending upon the phasing of the control signals with respect to positive or negative half-cycles of the power current 60, one or the other of the SCR's 46' and 53' conducts cyclically to provide a unidirectional pulsating current through the motor 44'. Similarly, any desired number of transmitters may be employed, for providing different frequencies of alternating voltage in the control pulses, thereby to individually and selectively control the speeds and directions of a plurality of motors in vehicles or other devices all receiving power from the same track or power distribution system.

In accordance with a feature of the invention, while the various remotely controlled motors are being controlled in speed and direction, all headlights on the vehicles, and other lights and accessories connected to the tracks 11, 12, receive full alternating power voltage 60 at all times, so that the brightness of lights, or actuation of other devices, remains realistic and unaffected by the controlling of speed and direction of the trains, automobiles, or other vehicles of the system. If desired, the remote control system of the invention can employ one or more transmitters for controlling one or more accessory devices of the system, such as coupling and uncoupling devices for trains, or doors of stations, devices for loading or unloading the vehicles, missile launchers, etc., all of these being electrically connected to receive their power from the tracks 11, 12, without the necessity for running additional power wiring to these devices. Another feature of the invention is that the power current pulses applied to the train motors, cause the trains to operate smoothly and realistically at low speeds, and to start up slowly without the jerking that often occurs in previous systems which control speed by varying the amplitude of power current applied to the motors.

In the circuit of FIGURE 2, a power supply transformer 71 has a primary winding 72 connected to a plug 73 adapted to be plugged into household 110 v. 60 cycle power. A secondary winding 74 has the ends thereof cross-connected to a pair of contacts 76 and 77 for a switch arm 78, and a pair of contacts 81 and 82 for a switch arm 83, the switch arms 78 and 83 being mechanically coupled together to provide the direction switch 32 shown in FIGURE 1. Switch arm 83 is connected to a conductor 86, and switch arm 78 is connected, via a rectifier 88 and resistor 89, to a conductor 87. A Zener diode 90 is connected between the conductors 86 and 87, whereby the voltage applied to the conductors 86 and 87 by the just-described power supply, comprises positive-polarity half-cycles of voltage, which occur during either the positive or negative half cycles of the 60 cycle power voltage depending on the position of the direction switch 32.

A transistor 89' is connected in a Colpitts oscillator circuit, and has a base electrode 91 connected to the junction of a pair of resistors 92 and 93 connected in series between the conductors 86 and 87, and an emitter electrode 94 connected via a resistor 96 to the conductor 87, and a collector electrode 97 connected via an inductor 98 to the conductor 86. A pair of capacitors 101 and 102 are connected in series across the inductor 98, to form in conjunction therewith a parallel tuned circuit resonant at the desired alternating control voltage of the control pulses to be produced by the transmitter, for example 100 kc. The junction of the capacitors 101 and 102 is connected to the emitter electrode 94, and the alternating output signal of the oscillator is taken from the emitter and applied, via capacitor 103, to the base electrode 104 of a driver transistor 106.

The phase control circuit 29 comprises a unijunction transistor 107 having an emitter electrode 108 connected via a capacitor 109 to the conductor 86. A fixed resistor 111 and a variable resistor 112 are connected in series between the emitter electrode 108 and the conductor 87. The variable resistor 112 is adjusted in resistance by means of the speed control knob 31 shown in FIGURE 1. Resistors 113 and 114, respectively, connect the base 2 and base 1 electrodes 116 and 117 of the unijunction transistor 107 to the conductors 86 and 87, and the electrode 117 is connected to the control electrode 118 of an SCR 119 in the gate circuit 27. The phase control circuit is, in effect, a low-frequency oscillator, which tends to oscillate in the vicinity of 60 cycles, and the frequency of which is varied by means of the variable resistor 112, and the output signal thereof is applied to the control electrode 118 of the SCR 119 in the gate circuit 27. The cathode 121 of the SCR 119 is connected to the conductor 86, and the anode 122 thereof is connected via a resistor 123 to the conductor 87. The anode 122 is connected via a resistor 124 to the base electrode 104 of the transistor 106, this base electrode also being connected via a resistor 126 to the conductor 87. The anode 122 of SCR 119 also is connected, via a primary winding 127 of a transformer 128, to the collector electrode 129, the emitter electrode 131 being connected to the conductor 87. A secondary winding 132 of the transformer 128 is adapted to be connected across the tracks 11 and 12 or to the conductors of an electrical distribution system for conveying power to motors.

The oscillatory pulse output of the phase control circuit 29, which is controlled in frequency by the variable resistor 112 in conjunction with capacitor 109 so as to adjust the phasing of these pulses with respect to the 60 cycle power current of the system, controls the point during each power half-cycle at which the SCR 119 is turned on, so as to gate open for amplification the driver transistor 106, whereupon the 100 kc. alternating signal supplied by the oscillator 26 via capacitor 103, is amplified by the driver transistor 106 and applied to the output of the transmitter at the secondary winding 132, in the form of the pulses 61 or 62 as shown in FIGURE 4, depending upon the setting of the direction control switch 32.

In the alternative transmitter shown in FIGURE 3, the power supply is the same as shown in FIGURE 2. The gate and phase control are combined in a circuit comprising an SCR connected in a gate circuit similar to that of FIGURE 2, in which the gating phase is controlled, as before, by a variable resistor 112. The driver and oscillator stages are combined in a single stage, in which the resonant circuit comprising the inductor 98 and capacitors 101 and 102, is connected between the collector electrode 129 of the driver transistor 106 and the anode 122 of the gating SCR 136. The output transformer 128, in this embodiment, is connected between the emitter electrode 131 and the conductor 87.

While preferred embodiments and modifications have been shown and described, various other embodiments and modifications will be apparent to those skilled in the art, and will fall within the scope of invention as defined in the following claims.

What I claim is:

1. A motor control system for use in a system having electrical distribution means for applying alternating current of given frequency to at least one electric motor operable on unidirectional current, said motor control system comprising transmitter means adapted to produce repetitive control pulses of alternative voltage at a selected frequency greater than said given frequency and occurring during at least a portion of alternate half-cycles of said alternating current, means to vary the phase of the occurrence of said control pulses within said alternate half-cycles of alternating current to vary the speed of rotation of said motor, means for shifting the occurrence of the control pulses from times during one set of alternate half-cycles of the power current of times during the other set of alternate half-cycles to control the direction of rotation of said motor, means to apply said repetitive control pulses to said electrical distribution means, and receiver means comprising a pair of electrically controlled rectifier devices connected in parallel with unlike current terminals connected together and each having a control electrode, said pair of rectifier devices being connected to selectively apply said alternating current to said motor, and filter means responsive to said selected frequency of the alternating voltage of the control pulses and connected to each of said control electrodes to cause periodic actuation of said electrically controlled rectifier means only in response to control pulses having said selected frequency of alternating voltage, thereby to apply unidirectional current to said motor from said alternating current, whereby said means in the transmitter to vary the phase of the control pulses will selectively control said motor.

2. A receiver as claimed in claim 1, in which said filter means comprises an inductance and capacitance connected in series to form a series resonant circuit resonant at said selected frequency of the control pulse alternating voltage, a pair of secondary windings inductively coupled to said inductance, and means respectively connecting said secondary windings for application of the control pulses to said control electrodes of the two rectifier devices.

References Cited

UNITED STATES PATENTS

| | | | |
|---|---|---|---|
| 3,127,553 | 3/1964 | Grabau | 318—345 X |
| 3,211,111 | 10/1965 | Morley | 318—16 |
| 3,299,334 | 1/1967 | Ramadan | 318—16 |
| 2,653,289 | 9/1953 | Kelling | 318—345 X |
| 2,699,301 | 1/1955 | Clute | 318—16 X |
| 3,144,598 | 8/1964 | Merritt | 318—16 X |

ORIS L. RADER, *Primary Examiner.*

T. LYNCH, *Assistant Examiner.*